Jan. 31, 1956

C. S. HEDGES 2,732,974

REFRIGERATED VENDING MACHINE

Filed May 24, 1952

INVENTOR.
Charles S. Hedges
BY
ATTORNEY.

United States Patent Office 2,732,974
Patented Jan. 31, 1956

2,732,974

REFRIGERATED VENDING MACHINE

Charles S. Hedges, Kansas City, Mo., assignor to The Vendo Company, Kansas City, Mo., a corporation of Missouri Application May 24, 1952, Serial No. 289,857

1 Claim. (Cl. 221—184)

This invention relates to improvements in machines for automatically vending articles of merchandise, particularly of the type requiring refrigeration while under storage, one of the most important objects being to include structure for preventing condensation accumulating on the discharge chute, the refrigerating equipment itself being utilized herein to accomplish such purpose.

It is an important object of the present invention to provide in a vending machine novel control mechanism for agitating articles to be vended that are in turn disposed within a cold storage chamber, which mechanism also includes discharge control means in the nature of a reciprocable carrier for transferring the articles singly from the storage chamber to the aforementioned delivery chute.

An important aim hereof is to provide in the control mechanism, a pair of opposed agitators that reciprocate with the discharge carrier, each adapted to transfer, urge or push articles disposed thereabove, in the storage chamber, from corresponding inclined baffles to a guide passage for the articles and from which the carrier transfers such articles to the delivery chute.

A novel feature of the present invention likewise lies in the form of the agitating elements themselves and including a pair of opposed, inclined plates, together with the provision of guide walls forming a part of and adjacent to the guide passage, to positively obviate any tendency for bridging of the articles in the cold storage chamber and to assure that there is always presented an article to the reciprocable carrier whenever the same is in a stand-condition ready for operation by a potential customer.

Another important object hereof is to provide yieldable means adjacent the guide passage and overlying the reciprocable carrier from positively ejecting the article to be dispensed from the opening in such carrier.

Other objects include the way in which structure in addition to that above set forth, is provided within the cold storage chamber for guiding the articles of merchandise to the guide passage and thereby obviate throughout the possibility of jamming, bridging or clogging of the articles to be dispensed.

Figure 2:
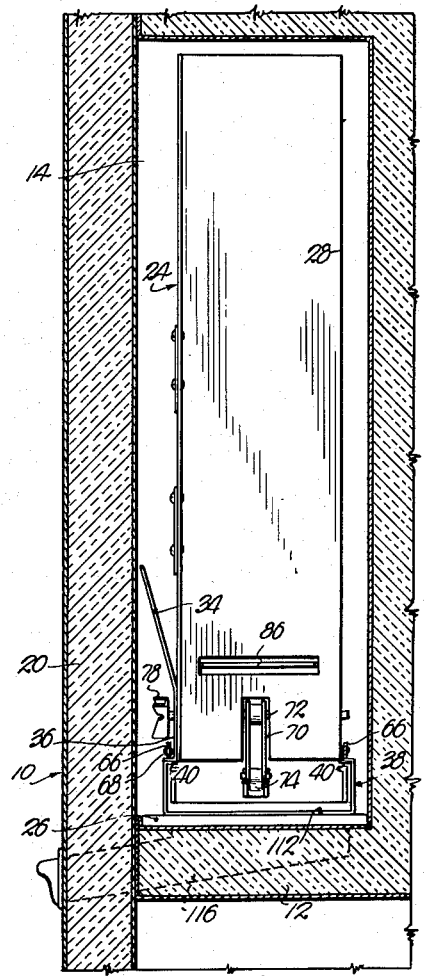
Fig. 2 is a fragmentary, vertical, cross-sectional view through the vending machine cabinet and its door and illustrating one end of the unit shown in Fig. 1 properly disposed in the cabinet.
Figure 3:
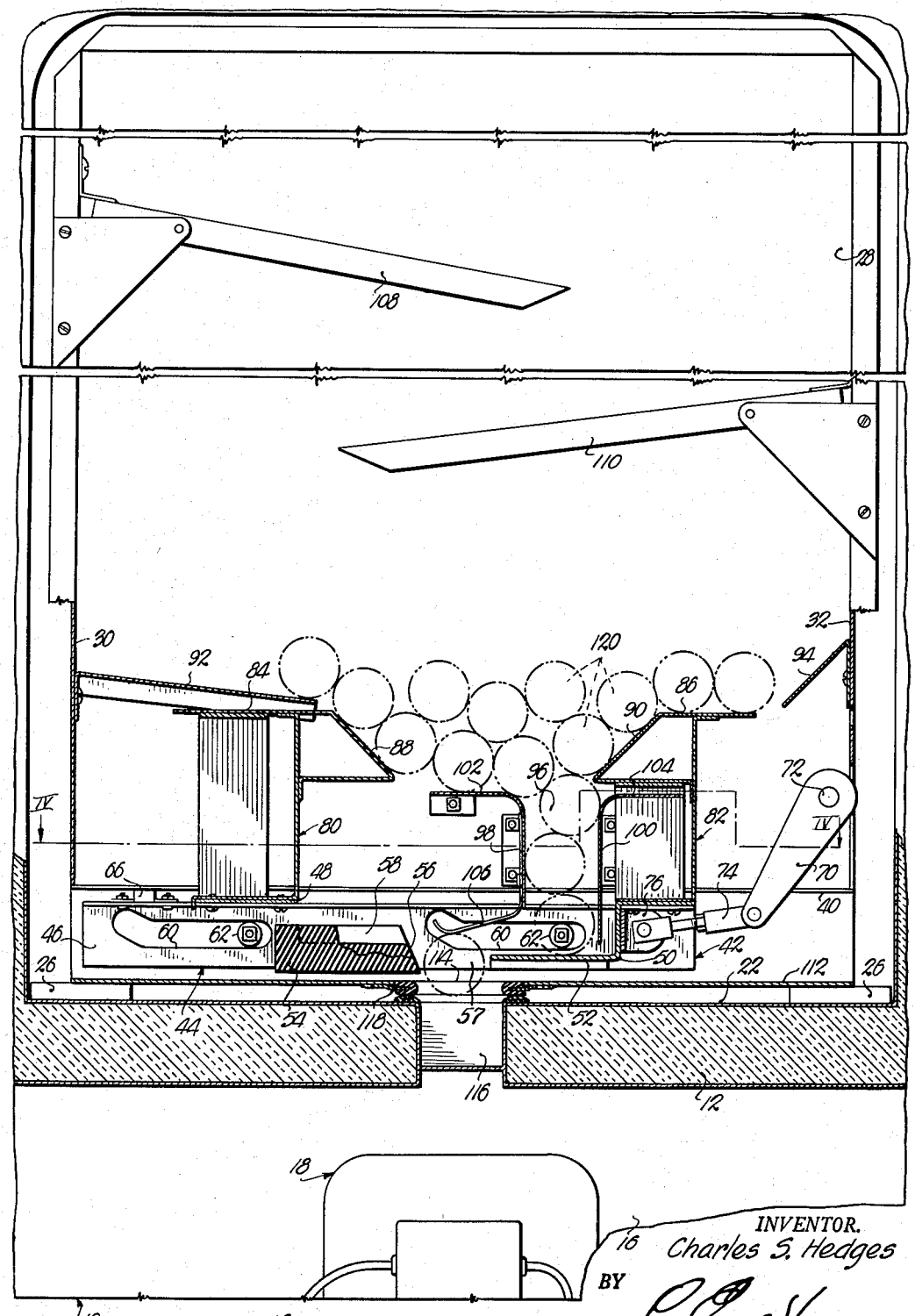
Fig. 3 is a fragmentary, front elevational view of the vending machine with the door thereof entirely removed and parts being broken away and in section to reveal details of construction.

The insulated cabinet illustrated fragmentarily in Figs. 2 and 3 of the drawings, forms a part of the vending machine constituting the subject matter of the present invention, which cabinet is broadly designated by the numeral 10. A horizontal partition 12 sets off a cold storage chamber 14 thereabove, and a compartment 16 for receiving refrigerating equipment broadly designated by the numeral 18.

A door 20, shown only in Fig. 2 of the drawings, is preferably mounted for swinging movement to and from a position closing the chamber 14 and the compartment 16. A shallow pocket having a bottom wall 22 is formed in the partition 12 for receiving a unit 24 normally disposed within the chamber 14 but entirely removable therefrom, said unit 24 being illustrated in its entirety in Fig. 1 of the drawings.

A pair of spaced, elongated feet 26 on the unit 24, fit snugly within the aforesaid cavity upon wall 22 to prevent lateral displacement of the unit 24 when the same is within the chamber 14.

The unit 24 is provided with a back wall 28 and a pair of side walls 30 and 32. Except for the provision of an inclined plate 34 that extends downwardly into a vertical portion 36, the front of the unit 24 is entirely open. The back wall 28, side walls 30 and 32, the plate 34 and the vertical portion 36, are joined rigidly to an elongated channel-shaped base 38 to which the feet 26 are secured. The base 38 is open at its top and at both ends thereof and is provided with inturned flanges 40 that extend longitudinally thereof.

The base 38 receives a combination article agitating and discharge control mechanism broadly designated by the numeral 42, that extends upwardly above the level of the flanges 40 as illustrated in Fig. 3 of the drawings. The mechanism 42 is provided with a reciprocable carrier 44 that moves along the longitudinal axis of the base 38 and includes a pair of opposed, elongated, L-shaped bars 46 housed within the base 38 immediately below the flanges 40 thereof. The bars 46 are joined by a cross plate 48 and by a Z-shaped cross-member 50 having a wall 52 that is disposed in a horizontal plane below the uppermost edge of the bars 46. The bars 46 are likewise interconnected by an elongated, polygonal block 54 having an inclined, forwardmost edge 56 spaced from the proximal edge of the wall 52 presenting an article discharge opening 57 in the carrier 44. The block 54 is likewise provided with a plurality of elongated cavities 58 in the uppermost face thereof having their longitudinal axes coincident with the reciprocable path of travel of the mechanism 42. Each bar 46 is provided with a pair of elongated, substantially L-shaped slots 60 for receiving corresponding rollers 62 on the innermost faces of the base 38, thereby guiding the mechanism 42 for reciprocable movement longitudinally of the base 38 and for movement toward and away from the bottom wall 22 of the cold storage chamber 14.

Figure 1:
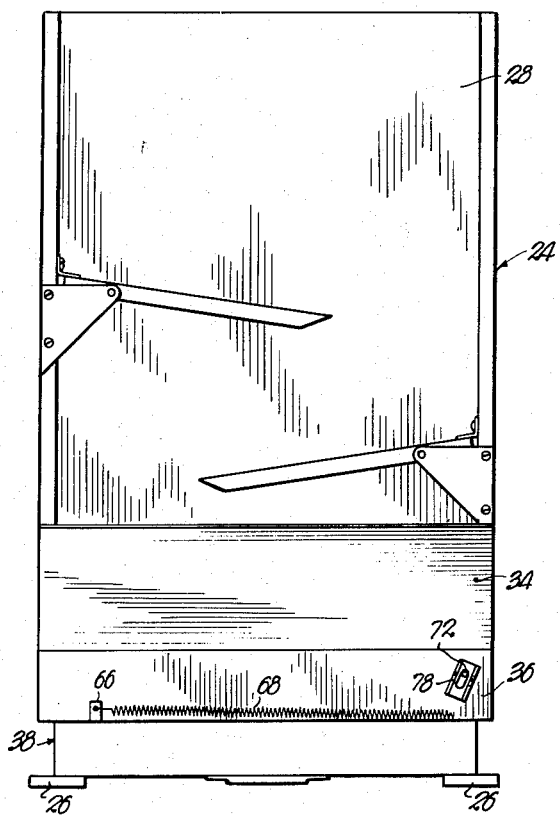
Figure 1 is a front elevational view of a removable unit including an article actuating and discharge control mechanism forming a part of a refrigerated vending machine made pursuant to the present invention and entirely removed from the cabinet within which it is normally disposed.
Figure 4:
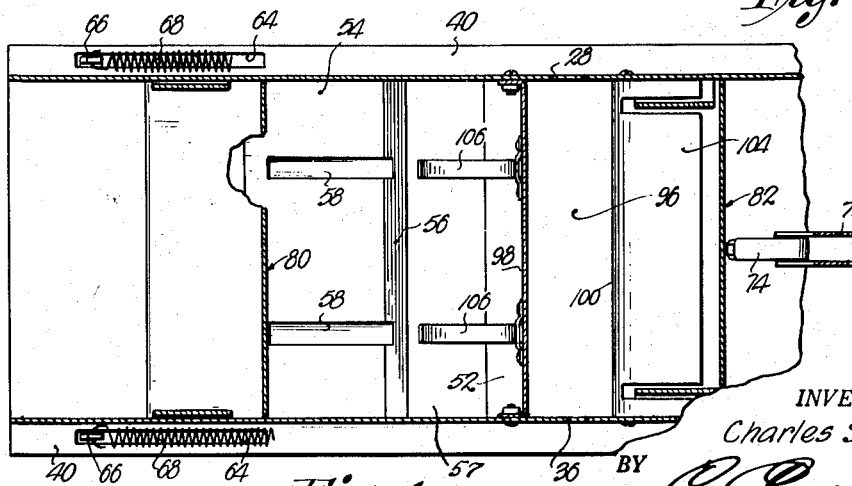
Fig. 4 is a transverse, cross-sectional view taken on line IV—IV of Fig. 3.

A slot 64 in each flange 40, receives a short link 66 extending upwardly from the respective bars 46 to which is attached one end of a spring 68 for yieldably holding the mechanism 42 at one end of its path of travel opposite to that illustrated in Figs. 1, 3 and 4 of the drawings. Movement of the mechanism 42 to the position shown in Fig. 3 against the action of the spring 68, is accomplished by means of a crank 70 rigid to a shaft 72 and extending laterally therefrom, the shaft 72 being journaled for rotation in the wall 28 and the upright portion 36 of plate 34.

An adjustable link 74 pivotally interconnects the crank 70 and a bracket 76 on the member 50. A coupling 78 on the shaft 72 is normally connected with a driven shaft, not shown, and carried by the door 20.

Coin controlled mechanism including a manual lever all not herein illustrated, may be provided for rotating the shaft 72, one type of "Control Mechanism for Vending Machines" being illustrated in my U. S. co-pending application, Serial No. 289,858, filed on even date herewith.

The cross plate 48 and the member 50 carry upstanding agitators 80 and 82 respectively, having top walls 84 and 86 respectively and inclined plates 88 and 90 respectively, that converge as the lowermost ends thereof are approached. When the mechanism 42 is at that end of its path of travel shown in Fig. 3, the top wall 84 of agitator 80 underlies an inclined baffle element 92, whereas when the mechanism is at the opposite end of its path of travel, the top wall 86 of agitator 82 underlies an inclined baffle element 94. The baffle elements 92 and 94, as well as the plates 88 and 90, slope toward an article guide passage 96 that includes a pair of vertical walls 98 and 100, and a pair of guide walls 102 and 104 respectively, it being noted that the inclined plates 88 and 90 alternately overlie their corresponding walls 102 and 104. The walls 98, 100, 102 and 104 forming the guide passage 96, are interposed between the wall 28 and the upright portion 36 of the unit 24 to which the same are attached. It is noted that the wall 100 extends downwardly below the uppermost edge of bars 46 and terminates just above the wall 52. A leaf spring 106 is provided for each cavity 58 respectively and mounted on the wall 98 of the guide passage 96. The walls 30 and 32 support a pair of shelf-like baffle elements 108 and 110 respectively that are pivotally secured thereto for clearing the space above the baffles 92 and 94 as desired.

The bottom wall 112 of the base 38 has an outlet opening 114 that registers with an inclined delivery chute 116 in the partition 12 and the door 20, there being a seal 118 on the walls 22 and 112 respectively held interengaged when the unit 24 is resting on the wall 22. The bottom wall of the delivery chute 116 is disposed directly above the condenser of refrigerating unit 18 to receive the heat emanating therefrom.

The articles that are particularly adapted for vending by the machine hereof and designated by the numeral 120, are in the nature of elongated cylinders having a length less than the distance between wall 28 and upstanding wall 36 of unit 24, and a diameter that is slightly less than the distance between the walls 98 and 100. When the mechanism 42 is moved by spring 68 to one end of its path of travel opposite to that shown in Fig. 3, the block 54 is in overlying closed relationship to the opening 114 of wall 112 and the outlet opening is aligned with the open bottom of the guide passage 96 for receiving an article 120 that passes through the opening 57 and comes to rest upon the wall 112.

Upon oscillation of the shaft 72 to move the mechanism 42 to the position shown in Fig. 3 of the drawings, the article within the opening 57 will be shifted along the wall 112 and transferred to the delivery chute 116 by way of opening 114, and, the wall 52 of member 50 will move beneath the next article 120 as shown in Fig. 3. The article 120 in the opening 57 will slide beneath the springs 106 and the latter will serve to force the article 120 downwardly through the opening 114 and into the delivery chute 116 where it slides by force of gravity along the inclined delivery chute 116 to the purchaser. Each time that the mechanism 42 is reciprocated, the agitators 80 and 82 will operate to receive the articles 120 stacked thereabove from their corresponding baffle elements 92 and 94 respectively and urge the same toward the walls 102 and 104, as well as to push such articles 120 along the walls 102 and 104 and into the guiding passage 96. Thus, the plates 88 and 90, the baffle elements 92 and 94 and the shelf-like members 108 and 110 all cooperate in the structure forming the subject matter of this invention to obviate any tendency for the articles 120 to jam, clog, and particularly to bridge within the unit 24. In this respect, by virtue of the swinging movement of baffles 108 and 110, articles 120 thereneath are free to shift upwardly during vertical movement of the mechanism 42. The inclined plate 34 likewise assures movement of the articles 120 endwise toward the wall 28 where the same will be received by the guide passage 96 without jamming.

The heat emanating from the unit 18 will prevent the forming of condensate on the bottom wall of the delivery chute 116, which bottom wall is preferably of high heat conductive material and of course, the evaporation of any such condensate will likewise prevent the formation of ice in delivery chute 116.

Having thus described the invention what is claimed as new and desired to be secured by Letters Patent is:

In a vending machine, an article storage unit having a pair of spaced, vertical walls defining an article passage and a pair of opposed baffle elements inclined downwardly and inwardly toward the passage for guiding articles thereto, each vertical wall having an outwardly extending, horizontal guide wall; mechanism reciprocable horizontally beneath the passage transversely of the latter for receiving articles singly from the passage and discharging the same from the machine; means mounting said mechanism for vertical movement as it is reciprocated; an upstanding agitator on each side respectively of the passage and secured to the mechanism for shifting the articles from the baffle elements to the horizontal walls and thence into the passage as the mechanism is reciprocated; and a plurality of inclined, article-supporting baffle plates carried by said unit above the elements, said plates being swingable upwardly for free upward movement of the articles within the unit as the agitators move vertically with the mechanism.

References Cited in the file of this patent

UNITED STATES PATENTS

| 789,086 | Diebel | May 2, 1905 |
| 951,323 | Mathewson | Mar. 8, 1910 |
| 1,566,175 | Vaghi | Dec. 15, 1925 |
| 1,651,857 | Wilkinson | Dec. 6, 1927 |
| 1,778,187 | Du Grenier | Oct. 14, 1930 |
| 2,005,097 | Malkin | June 18, 1935 |
| 2,095,431 | Bugg | Oct. 12, 1937 |
| 2,308,532 | Mills | Jan. 19, 1943 |
| 2,638,395 | Smith | May 12, 1953 |

FOREIGN PATENTS

| 83 | Great Britain | of 1888 |